United States Patent [19]

Walsh

[11] Patent Number: 5,095,236

[45] Date of Patent: Mar. 10, 1992

[54] HOUSING FOR ELECTRIC MOTORS

[75] Inventor: Colm Walsh, Ashville, Ireland

[73] Assignee: Robert Krups GmbH & Co. K.G., Solingen, Fed. Rep. of Germany

[21] Appl. No.: 626,475

[22] Filed: Dec. 12, 1990

[51] Int. Cl.⁵ ............................................. H02K 9/06
[52] U.S. Cl. ................................. 310/89; 310/91; 310/42; 310/50; 310/40 MM
[58] Field of Search .................. 310/89, 90, 91, 42, 310/83, 85, 62, 63, 47, 50, 40 MM; 409/37, 38, 50, 55

[56] References Cited

U.S. PATENT DOCUMENTS

| 2,952,788 | 9/1960 | Volkerling et al. ........ 310/40 MM |
| 4,399,380 | 8/1983 | Hirano ........................ 310/89 |
| 4,615,230 | 10/1986 | Guichard ..................... 310/83 |
| 4,652,781 | 3/1987 | Andrei-Alexandru et al. ..... 310/83 |
| 4,663,549 | 5/1987 | Suzuki ........................ 310/62 |
| 4,763,031 | 8/1988 | Wang .......................... 310/83 |

Primary Examiner—Steven L. Stephan
Assistant Examiner—Matthew Nguyen
Attorney, Agent, or Firm—Peter K. Kontler

[57] ABSTRACT

A housing for electric motors of the type to be used in stirring apparatus and other household appliances has two mirror symmetrical shells with abutting external flanges which are riveted to each other. The median portions of the shells have aligned openings for a portion of a stator which surrounds a rotor on the motor shaft. The shaft further carries a fan wheel and a commutator. The openings are flanked by pairs of bridges which are provided on the respective shells and have integral sockets for spherical enlargements of the shaft. At least one of the shells has a bridge which carries a bearing sleeve for an output element which receives torque from the shaft.

15 Claims, 2 Drawing Sheets

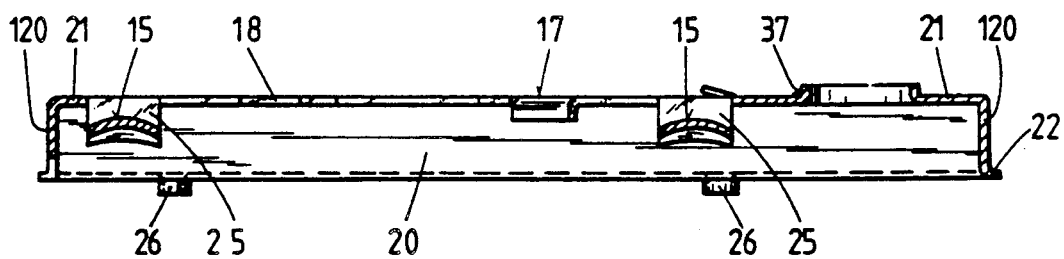
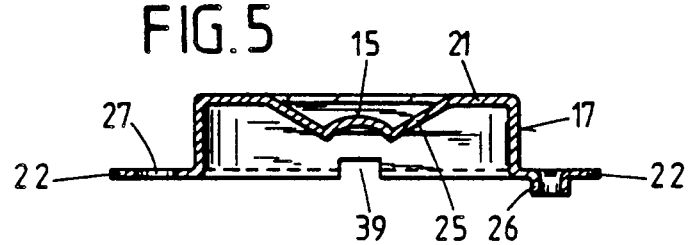
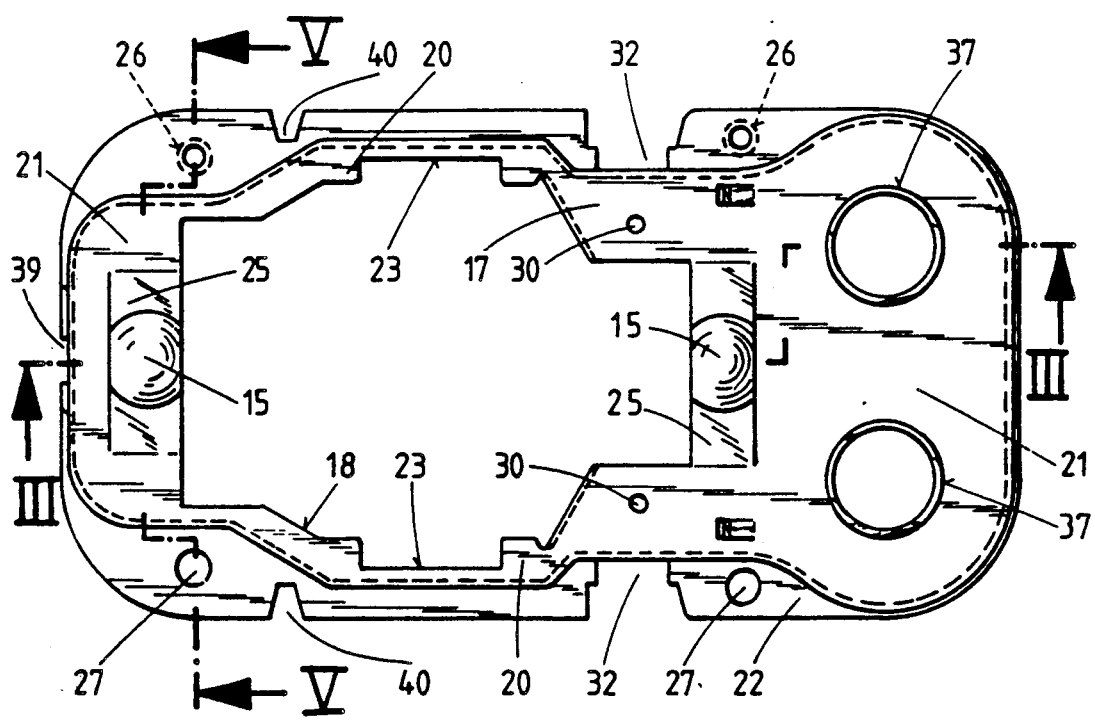

HOUSING FOR ELECTRIC MOTORS

BACKGROUND OF THE INVENTION

The invention relates to electric motors in general, and more particularly to improvements in frames, housings or casings for electric motors. Still more particularly, the invention relates to improvements in frames, housings or casings (hereinafter called housings) for electric motors which can be utilized with advantage in various electric household appliances such as stirring apparatus, electric knives and others.

It is already known to install the shaft, the rotor, the stator and certain other parts of an electric motor in a housing which is provided with bridges extending between the sidewalls of the housing and serving to journal the motor shaft as well as to carry one or more bearing members for one or more output elements which receive torque from the motor shaft. In accordance with a prior proposal, the motor housing is made of diecast light metal. The housing carries yokes which are made of spring steel and support bearings for the motor shaft. In addition, such yokes maintain the stator in a selected position. If the motor is used in a stirring or like apparatus, the output element which receives torque from the motor shaft normally comprises a worm drive. The worm wheel or worm wheels of such drive must be held against axial movement by specially designed parts, such as by clamping rings or the like. A further drawback of such prior motors and motor housings is that the motor housing by itself constitutes a rather expensive component and, in addition, it is necessary to employ numerous specially designed parts to properly position the shaft, the commutator as well as certain other components of the motor. Such specially produced parts contribute to initial cost of the motor and prolong the time of assembly of the motor preparatory to installation of the assembled motor in the body of a household appliance.

OBJECTS OF THE INVENTION

An object of the invention is to provide a novel and improved housing for use in electric motors, particularly in motors for use in certain types of household appliances, which is simpler and less expensive than heretofore known housings.

Another object of the invention is to provide a housing which is more versatile than conventional housings.

A further object of the invention is to provide a housing which can automatically center and/or otherwise position the shaft, the rotor, the stator, the commutator, the fan wheel, the output element or elements and, if necessary, certain other parts of an electric motor as soon as the assembly of the housing is completed.

An additional object of the invention is to provide an electric motor which embodies the above outlined housing.

Still another object of the invention is to provide a household appliance which embodies the above outlined motor and motor housing.

A further object of the invention is to provide a novel and improved method of assembling the parts of the above outlined housing and of assembling the housing and its parts with the shaft and other components of an electric motor.

Another object of the invention is to provide a housing wherein the motor shaft and the output element or elements can be positioned with a high degree of accuracy and wherein the assembly of the housing with other parts of the motor can be completed within a short interval of time.

Another object of the invention is to provide the housing with novel and improved bearings for the motor shaft.

A further object of the invention is to provide a housing which can properly journal the motor shaft and which can also properly support a thrust bearing for the motor shaft.

An additional object of the invention is to provide novel and improved housing sections which can be assembled with each other to constitute the aforediscussed housing and to properly position numerous component parts of an electric motor, particularly a motor for use in electric stirring apparatus, electric knives and other electric household appliances.

SUMMARY OF THE INVENTION

The invention resides in the provision of a housing for an electric motor, particularly a motor which is designed for use in household appliances (such as stirring apparatus, electric knives and the like) and has a rotary shaft serving to transmit torque to at least one output element and carrying a fan wheel, a commutator and a rotor which is surrounded by a stator. The improved housing comprises two interconnected hollow shells having median portions provided with openings for the stator, fan wheel and rotor. The shells are provided with bearings for the motor shaft, and at least one of the shells further comprises at least one bearing member for the at least one output element. The at least one shell preferably includes a bridge for the at least one bearing member Each shell can constitute a sheet metal stamping, and such shells preferably comprise confronting circumferentially extending external flanges. The housing further comprises means for securing the flanges to each other, and such securing means can include apertures in at least one of the flanges and sleeves provided at least on the other flange and being in register with the apertures of the at least one flange. The sleeves and the registering apertures can receive the shanks of rivets which connect the two flanges to each other.

Each shell can comprise at least one bridge, and the bearings for the motor shaft are provided on such bridges. For example, each shell can comprise two bridges which flank the respective opening, and each such bridge can be provided with a bearing for the motor shaft. The arrangement can be such that each bridge comprises a lamination; the laminations of bridges forming part of one of the shells extend toward the other shell and vice versa, and the bearings preferably form part of the respective laminations. Each such bearing can comprise a socket having a substantially hemispherical internal surface surrounding one-half of a spherical enlargement on the adjacent portion of the motor shaft. Each such enlargement can be confined in two bearings, one forming part of one of the shells and the other forming part of the other shell.

The at least one bearing member for the at least one output element can constitute or include an annular collar on the respective bridge.

The two shells can be mirror images of each other, and their flanges abut one another when the housing is properly assembled around the motor shaft, the rotor, the stator, the fan wheel and the commutator.

Each shell can be provided with holes for pins which carry brush holders adjacent the commutator in the assembled housing. Furthermore, the shells can be provided with windows which are adjacent the commutator and enable circuit connections for the bush holders to extend out of the housing.

If one end of the motor shaft bears against a thrust bearing, the shells can be provided with neighboring notches which jointly define an opening for a portion of the thrust bearing. Such notches can be provided in the aforementioned external flanges of the shells.

The flanges of the shells can be further provided with recesses for portions of distancing elements which are outwardly adjacent the housing.

The novel features which are considered as characteristic of the invention are set forth in particular in the appended claims. The improved housing itself, however, both as to its construction and the mode of assembling the same, together with additional features and advantages thereof, will be best understood upon perusal of the following detailed description of certain presently preferred specific embodiments with reference to the accompanying drawing.

BRIEF DESCRIPTION OF THE DRAWING

FIG. 3 is a central longitudinal sectional view of one of the two mirror symmetrical shells of the housing, the section being taken in the direction of arrows as seen from the line III—III in FIG. 4;

FIG. 4 is a plan view of the shell which is shown in FIG. 3; and

FIG. 5 is a sectional view as seen in the direction of arrows from the line V—V of FIG. 4.

DESCRIPTION OF PREFERRED EMBODIMENTS

Figure 1:
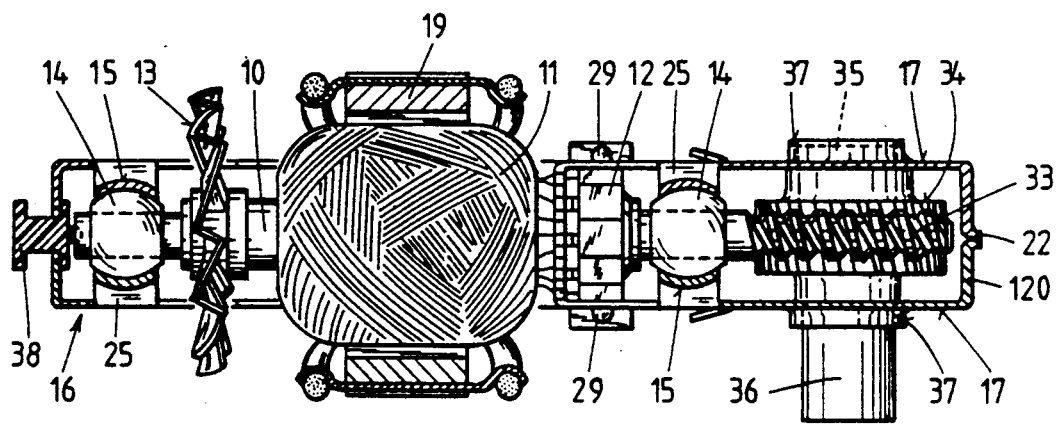
FIG. 1 is a central longitudinal sectional view of a housing which embodies one form of the invention and is assembled with the shaft, rotor, stator, fan wheel and commutator of an electric motor.
Figure 2:
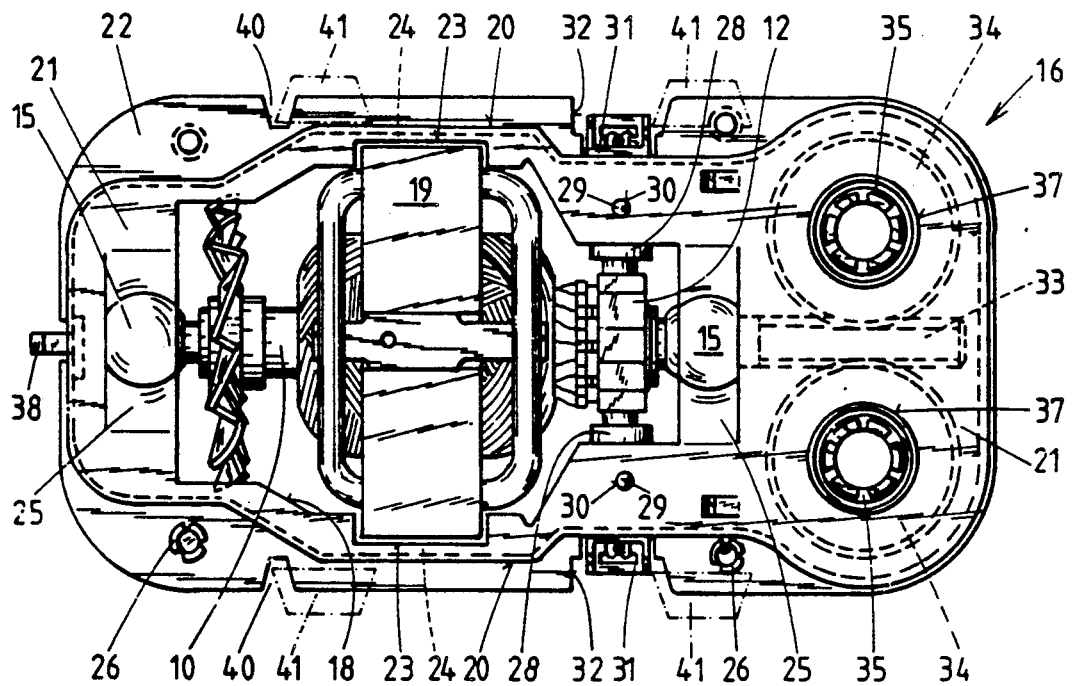
FIG. 2 is a plan view of the structure which is shown in FIG. 1.

The electric motor which is shown in FIGS. 1 and 2 comprises an elongated shaft 10 which carries a rotor 11, a commutator 12 at one side of the rotor, and a fan wheel 13 at the other side of the rotor. The rotor 11 is surrounded by a stator 19. The parts 11, 12 and 13 share the angular movements of the shaft 10, and the latter is journalled in a novel and improved housing 16 comprising two mirror symmetrical sections or shells 17 (hereinafter called shells) which can constitute stampings made of metallic sheet material. The shaft 10 carries a first spherical enlargement 14 which is outwardly adjacent the fan wheel 13, and a second spherical enlargement 14 which is outwardly adjacent the commutator 12. Each of these enlargements is received in two mirror symmetrical bearings in the form of sockets 15 having concave hemispherical internal surfaces. One bearing socket 15 for each enlargement 14 forms part of one of the shells 17, and the other socket 15 forms part of the other shell 17.

Each shell 17 resembles a shallow tray or pan having a rectangular outline and including two longitudinally extending sidewalls 20, two transversely extending sidewalls 120, a circumferential flange 22 which extends outwardly from the lower marginal portions of the sidewalls 20, 120 (as seen in FIG. 3 or 5), and two bridges 21 which extend between the sidewalls 20 opposite the flanges 22. The bridges 21 flank a relatively large opening 18 in the median portion of the respective shell 17, and such opening provides room for a portion of the fan wheel 13, for a portion of the rotor 11 and for a portion of the stator 19. As can be seen in FIGS. 3 and 5, each shell 17 comprises several portions each of which has a substantially Z-shaped outline to enhance the stability of the shell. For example, and referring to the right-hand portion of FIG. 3, the flange 22 at the lower end of the sidewall 120, the sidewall 120 and the adjacent bridge 21 constitute a substantially Z-shaped body.

The flanges 22 of the two shells 17 confront and abut each other. Such flanges can be secured to each other by rivets (not specifically shown) which extend through apertures 27 provided in at least one of the flanges 22 and registering sleeves 26 provided at least on the other flange 22. As can be seen in FIG. 5, the arrangement is or can be such that each flange 22 has apertures 27 and sleeves 26, that the apertures 27 in one flange 22 register with the sleeves 26 of the other flange 22 and that the apertures of the other flange register with the sleeves of the one flange. The flanges 22 may but need not be circumferentially complete; in addition, the width of these flanges need not be constant (see FIGS. 2 and 5).

When the two shells 17 are properly positioned relative to and are properly secured to each other, the resulting housing 16 defines an internal space which communicates with the surrounding atmosphere primarily by way of the two openings 18 between the pairs of bridges 21 of the respective shells. The stator 19 has external projections 24 which abut portions of the shells 17 or are confined between adjacent portions of flanges 22 to ensure that the angular position of the stator cannot change as soon as the assembly of the shells 17 into the housing 16 is completed. The projections 24 can extend into complementary channels or grooves 23 of the housing 16 to ensure that the stator 19 is held against any axial and/or angular movements when the assembly of the housing 16 with the motor shaft 10, fan wheel 13, commutator 12, rotor 11 and stator 19 is completed. The channels or grooves 23 can be provided in the sidewalls 20 of the shells 17.

Each of the four bridges 21 has an inwardly extending portion in the form of a lamination 25 which is integral with the respective bearing or socket 15. The laminations 25 on the bridges 21 of one of the shells 17 extend toward the other shell 17, and the laminations 25 on the bridges 21 of the other shell extend toward the one shell. This can be seen in FIGS. 1, 3 and 5.

The means for supplying electric current to the commutator 12 comprises customary brush holders 28 which are affixed to at least one of the shells 17 by pins 29 received in holes 30 of the adjacent bridges 21. The circuit connections 31 for the brush holders 29 are readily accessible and extend from the housing 16 through two windows 32 which are provided in the sidewalls 20 and are substantially filled by the respective circuit connections.

That end portion of the motor shaft 10 which extends beyond the commutator 12 and the corresponding pair of bearing sockets 15 constitutes a worm 33 in mesh with two worm wheels 34 which constitute output elements and receive torque from the shaft 10 when the motor is on. Each of the two output elements 34 is journalled in the adjacent pair of bridges 21, and each of these output elements has two coaxial stubs 35, 36 one of which is journalled in a bridge 21 of one of the shells 17 and the other of which is journalled in a bridge 21 of the other shell 17. The bearing members for the stubs 35, 36 constitute collars 37 which are integral parts of the respective bridges 21. The longer stubs 36 project well below the corresponding bridge 21 and can serve to transmit torque to stirring, kneading mixing or other tools in a household appliance, not shown. The shorter stubs 35 can confine prong- or finger-like detent elements (not specifically shown) which can be actuated by a releasing mechanism to disengage the stubs 36 from the mixing, kneading, stirring or other tools.

That end of the shaft 10 which is remote from the worm 33 abuts a portion of a thrust bearing 38. A portion of this thrust bearing extends from the housing 16, namely through a composite opening which is defined by two aligned mirror symmetrical notches (FIGS. 4 and 5) provided in adjacent portions of the flanges 22. The thrust bearing 38 can be made of a suitable plastic material and includes a plate which receives a portion of a sphere. The other portion of such sphere is received in a socket in the adjacent end face of the shaft 10. The opening which includes the two notches 39 surrounds a portion of the stem or shank of the thrust bearing 38.

In order to properly prop or support the sides of the housing 16 in the frame or casing (not shown) of a household appliance, the flanges 22 are provided with pairs of recesses or cutouts 40 which are adjacent the respective sidewalls 20 and serve to receive portions of suitable distancing elements or buffers 41. Portions of certain distancing elements 41 can also extend into the aforementioned windows 32 for the circuit connections 31.

Though the drawing shows a housing 16 which is made of a metallic sheet material, it is also within the purview of the invention to assemble the housing of sections or shells which are made of an electrically insulating plastic or other material.

An important advantage of the improved housing 16 is that the bearings (15) for the motor shaft 10 and the bearing members (37) for the output elements 34 are integral parts of the shells 17. This simplifies the making of the housing and shortens the interval of time which is needed to assemble the housing 16 with other parts of the electric motor. Furthermore, the shells 17 can serve to properly position and support the thrust bearing 38, the distancing elements 41 and the circuit connections 31. Thus, the versatility of the improved housing 16 greatly exceeds the versatility of heretofore known housings for electric motors which are intended for use in relatively small mixing, stirring, kneading and like apparatus constituting household appliances. The shells 17 can be mass-produced at a low cost in available stamping or other machines.

The configuration and/or dimensions of the stator can depart from the configuration and/or dimensions of the illustrated stator 19. This is due to the fact that the shape and/or the size of openings 18 in the shells 17 can be changed to thus ensure proper confinement of the selected stator. The same holds true for the output elements 34; the illustrated output elements in the form of worm wheels can be replaced with otherwise configurated output elements. For example, the means for transmitting torque from the motor shaft 10 to one or more rotary stirring, kneading, mixing or other tools can include one or more spur gear transmissions, one or more bevel gear transmissions, one or more slider-crank mechanisms or any other suitable torque transmitting means. As already mentioned above, the transmission or transmissions which are put to use to transmit torque from the motor shaft 10 to one or more rotary mixing, stirring, kneading or other tools are preferably designed to permit the utilization of ejectors for the tool or tools, e.g., by providing detent members which can be actuated to release the shanks of the tools and to thereupon expel the released tools from the output elements.

If the shells 17 are made, at least in part, of an electrically insulating plastic or other material, they can be used as carriers of electric conductors in the form of wires, printed circuits or the like. In addition, shells which are made of an insulating material can be used to carry electrical and/or electronic control or regulating elements and/or interference and/or noise suppressing parts.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A housing for an electric motor, particularly for use in household appliances, wherein a rotary shaft transmits torque to at least one output element, said shaft carrying a rotor, a fan wheel and a commutator and the rotor being adjacent a stator, said housing comprising two hollow shells having median portions provided with openings for the stator, fan wheel and rotor, said shell further having bearings for the shaft and at least one of said shells further having at least one bearing member for the at least one output element, and means for securing said shells to each other.

2. The housing of claim 1, wherein said at least one shell includes a bridge and said at least one bearing member is provided on said bridge.

3. The housing of claim 1, wherein each of said shells is a sheet metal stamping and said shells have confronting circumferentially extending flanges, said securing means comprising means for securing said flanges to each other.

4. The housing of claim 3, wherein said securing means includes apertures provided in at least one of said flanges and sleeves provided at least on the other of said flanges in register with the apertures of said at least one flange.

5. The housing of claim 1, wherein each of said shells comprises at least one bridge and said bearings are provided on said bridges.

6. The housing of claim 5, wherein each of said shells comprises two bridges flanking the respective openings and each of said bridges is provided with a bearing for the shaft.

7. The housing of claim 5, wherein each of said bearings includes a socket having a substantially hemispherical internal surface.

8. The housing of claim 1, wherein said at least one shell includes a bridge and said at least one bearing member includes a collar on said bridge.

9. The housing of claim 1, wherein said shells are mirror images of each other.

10. The housing of claim 1, wherein each of said shells has holes for brush holder carrying pins adjacent the commutator.

11. The housing of claim 1, wherein each of said shells has windows adjacent the commutator for circuit connections of brush holders.

12. The housing of claim 1 for an electric motor wherein shaft has an end in engagement with a thrust bearing, said shells having neighboring notches jointly defining an opening for the thrust bearing.

13. The housing of claim 12, wherein said shells have abutting circumferentially extending flanges and said notches are provided in said flanges.

14. The housing of claim 1, wherein said shells have abutting circumferentially extending flanges provided with recesses, and further comprising distancing elements having portions extending into said recesses.

15. A housing for an electric motor, particularly for use in household appliances, wherein a rotary shaft carrying a rotor, a fan wheel and a commutator and the rotor being adjacent a stator, said housing comprising two interconnected hollow shells having median portions provided with openings for the stator, fan wheel and rotor, at least one of said shells further having at least one bearing member for the at least one output element, each of said shells comprising two bridges flanking the respective openings and each of said bridges being provided with a bearing for the shaft, each of said bridges including a lamination and the laminations of bridges of one of said shells extending toward the other shell, the laminations of the bridges of the other of said shells extending toward said one shell and said bearings forming part of the respective laminations.

* * * * *